United States Patent
Torigoe

(10) Patent No.: US 6,876,460 B2
(45) Date of Patent: Apr. 5, 2005

(54) IMAGE PROCESSING APPARATUS, IMAGE PROCESSING METHOD AND STORAGE MEDIUM

(75) Inventor: Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 09/770,314

(22) Filed: Jan. 29, 2001

(65) Prior Publication Data

US 2002/0018228 A1 Feb. 14, 2002

(30) Foreign Application Priority Data

Jan. 31, 2000 (JP) .................................. 2000-021428
Jan. 31, 2000 (JP) .................................. 2000-021558
Jan. 31, 2000 (JP) .................................. 2000-021561

(51) Int. Cl.$^7$ .............................................. G06F 15/00
(52) U.S. Cl. .................. 358/1.14; 358/3.28; 382/100; 380/51
(58) Field of Search ................. 382/100; 358/1.14, 358/412, 3.28, 462, 426.01; 713/300; 380/53, 51

(56) References Cited

U.S. PATENT DOCUMENTS

| | | | | |
|---|---|---|---|---|
| 3,850,667 A | * | 11/1974 | Tani et al. ................. | 427/307 |
| 5,659,342 A | * | 8/1997 | Lund et al. ................ | 347/35 |
| 6,128,401 A | * | 10/2000 | Suzuki et al. ............. | 382/135 |
| 6,263,086 B1 | * | 7/2001 | Wang ........................ | 382/100 |
| 6,358,596 B1 | * | 3/2002 | Mehta et al. ............... | 428/172 |
| 6,585,341 B1 | * | 7/2003 | Walker et al. .............. | 347/14 |
| 6,607,813 B2 | * | 8/2003 | Washburn et al. ........... | 283/113 |
| 6,616,359 B1 | * | 9/2003 | Nakagiri et al. ........... | 400/582 |
| 6,639,688 B2 | * | 10/2003 | Imai ......................... | 358/1.14 |
| 2002/0039198 A1 | * | 4/2002 | Nguyen et al. ............. | 358/1.18 |
| 2002/0145759 A1 | * | 10/2002 | Miller ....................... | 358/3.28 |

* cited by examiner

Primary Examiner—Bhavesh M. Mehta
Assistant Examiner—Barry Choobin
(74) Attorney, Agent, or Firm—Fitzpatrick, Cella, Harper & Scinto

(57) ABSTRACT

There is disclosed an image processing apparatus for solving a problem that much time is required for judging specific information when the specific information such as a digital watermark is judged and printing is controlled, the apparatus comprising: indication means for indicating a mode from a first printing mode and a second printing mode higher in speed than the first printing mode; judgment means for judging whether or not specific information exists in an original; and printing means for, when the indication means indicates the second printing mode, printing an image in accordance with the original without performing the judgment by the judgment means.

11 Claims, 9 Drawing Sheets

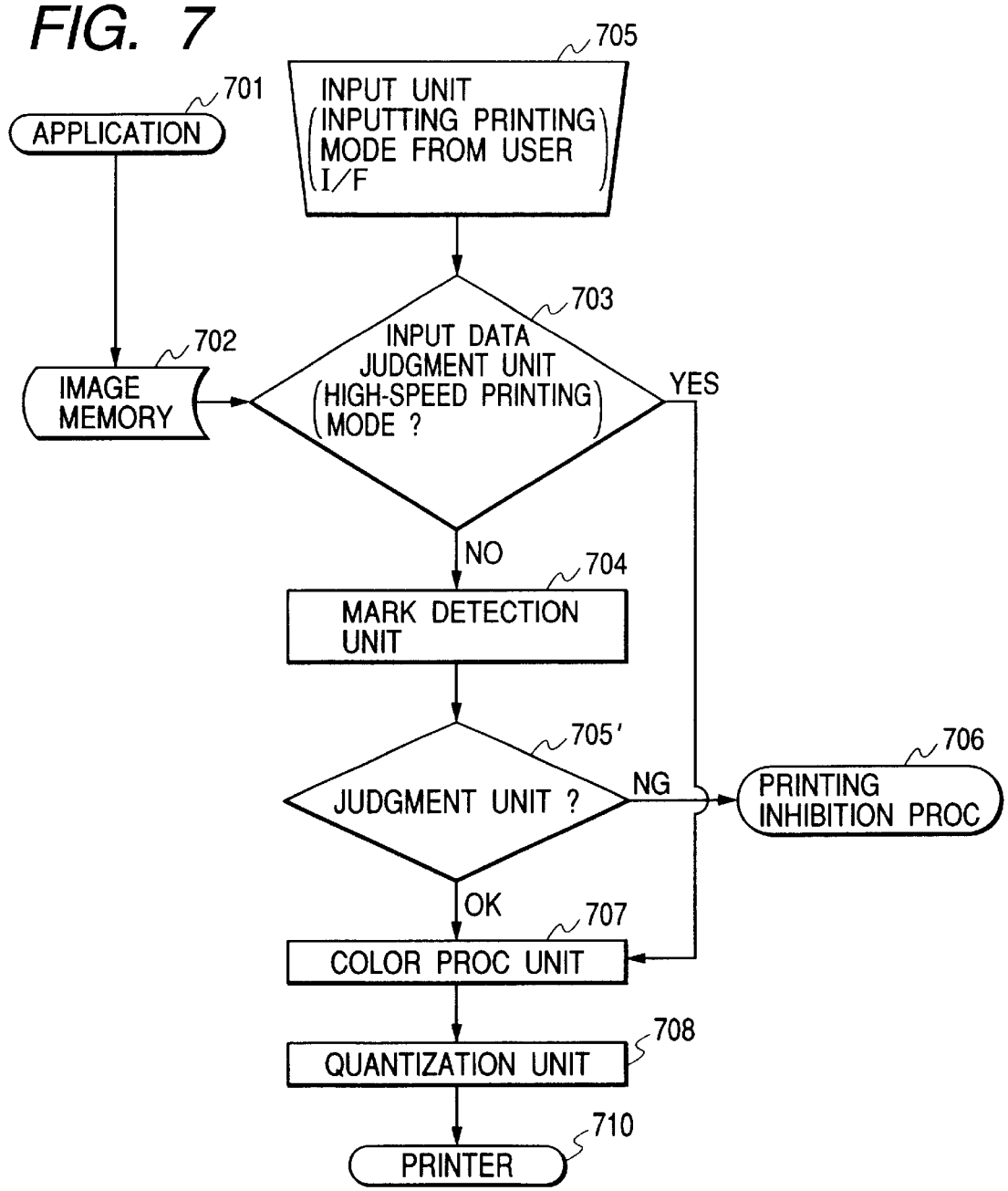

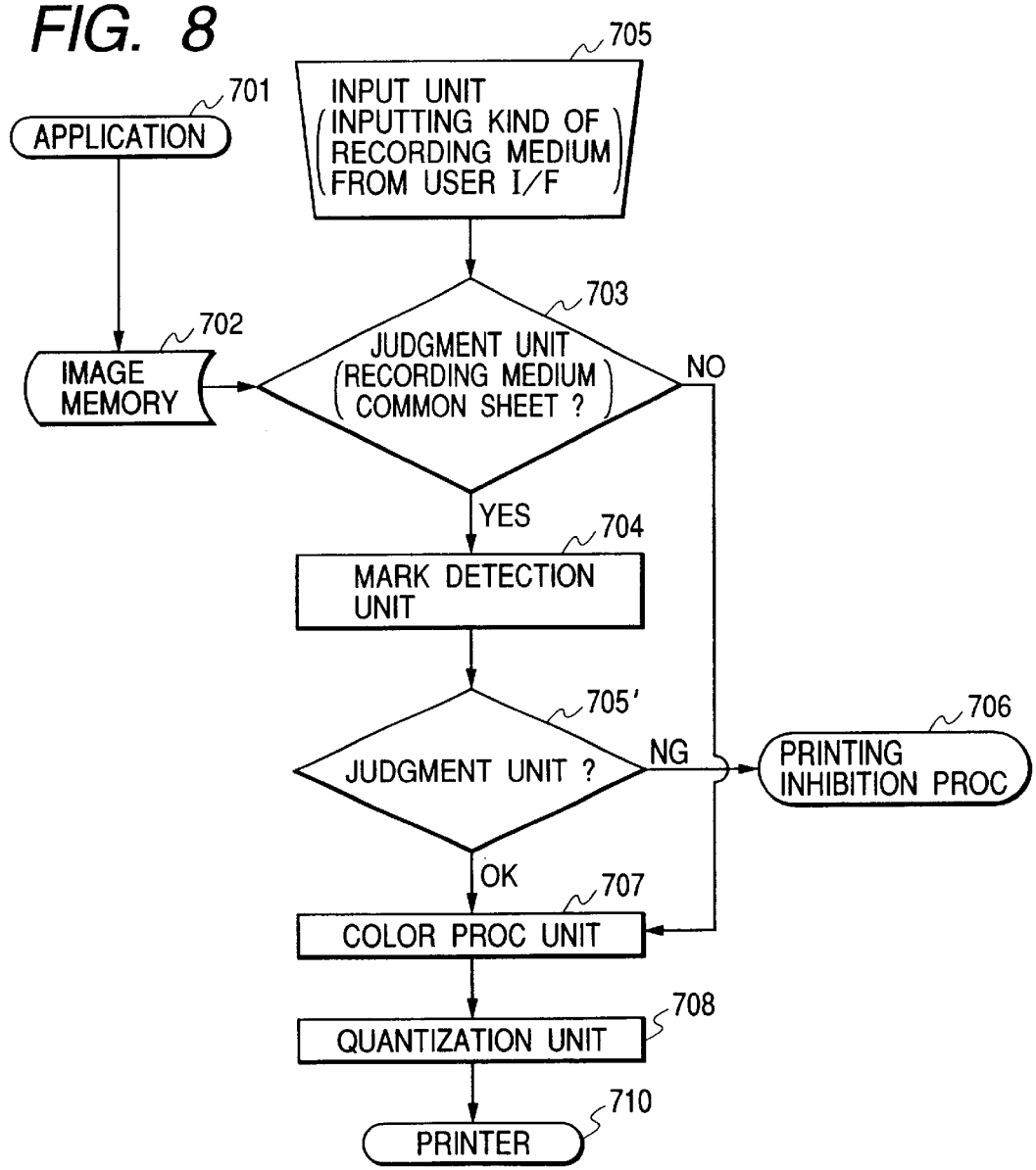

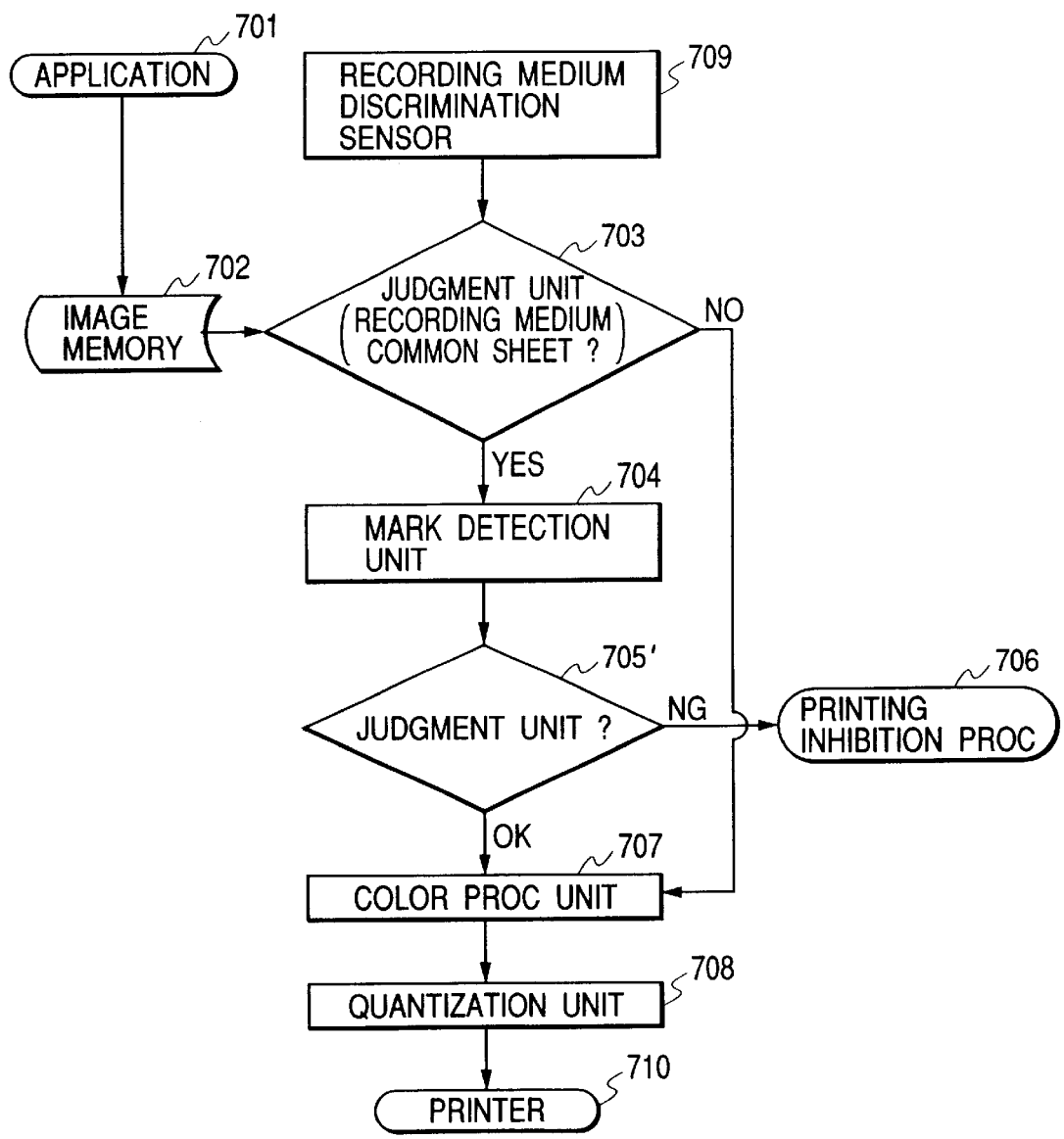

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method, and a storage medium.

2. Related Background Art

Researches for multiplexing another image in image information have been carried out well.

In recent years, as a digital watermark technique, a technique of multiplexing additional information such as an author name and permission/rejection of use in image information such as a photograph and a picture in such a manner that the additional information is difficult to visually recognize, and distributing the information through Internet or another network has been standardized.

On the other hand, in recent years, from a viewpoint of preferable image reproduction, an image output apparatus sometimes performs various correction processings with respect to an original image.

Examples of the correction processing include luminance correction, chroma emphasis, lightness correction, and the like. For example, the image is analyzed, and subjected to preferable chroma correction in the processing. Moreover, in a constitution for judging a natural image, and acting only on the judged natural image, a gradation image or another image can be subjected to a processing in which gradation is regarded as important.

Furthermore, when a digital camera image having a small number of pixels is printed as the original image, appearance of the image is sometimes inferior as compared with when the image photographed by the high-pixel digital camera is printed. To solve the problem, known is a method of using antialiasing techniques such as a bi-cubic technique and a nearest neighbor technique and enlarging an input image to an appropriate size to print the image.

Additionally, the image to be printed sometimes includes noise. For example, a color noise by CCD device dark current, a jpeg block noise during image compression, and the like are included. In subtractive color mixture, a gray line is often very unstable, and gradation is sometimes reversed in a periphery of the gray line. Here, as a problem, a color which is to be originally gray is replaced with the color in the periphery of the gray line by the color noise, and the reversed portion easily appears on the printed image. To solve the problem, as a method of reducing the color noise, a smoothing filter with a fixed size is used for dyestuff data. Furthermore, there is also a method of removing the block noise.

It is assumed that the watermark is used for a purpose preventing illicit counterfeit of paper money, stamp, securities, and the like, besides the purpose of protecting a copyright. For example, a special mark or a watermark is multiplexed beforehand in the paper money, stamp, securities, and the like, this mark is detected by an image output apparatus, information is regarded as image information of the paper money, stamp, securities, and the like, and a processing for discontinuing printing, issuing a warning, or intentionally coating the entire surface with black is performed.

First, when the watermark is detected in a system for printing image data of the paper money, stamp, and the like from a personal computer with image output apparatuses such as an ink jet printer connected to the personal computer, in an operating system (OS) of the personal computer, some application software (hereinafter referred to as "application") is necessary for printing the image data. However, since an output from the application is emitted as a drawing command or a group of the commands, there is a problem that the output itself cannot be checked for presence/absence of the watermark. For example, in Windows operating system of Microsoft Co., Ltd., drawing is performed by the drawing command called GDI, but in some situation the presence/absence of the watermark cannot be distinguished unless the watermark is drawn and formed by separate GDI.

Moreover, when both functions of mark judgment and original image correction processings are introduced into the image output apparatuses such as the ink jet printer, the former processing for judging the presence of the mark is performed on the image data subjected to the latter various correction functions. In this case, since the corrected and modified image data is subjected to the judgment processing, there is a possibility that judgment precision is deteriorated, or that judgment becomes impossible.

Furthermore, in the aforementioned correction processing, there is a technique in which histogram creation means for creating a histogram based on pixel data of the original image is disposed, the pixel data accumulated from a predetermined pixel value and corresponding to a predetermined frequency is detected in the histogram, and color balance, contrast and chroma are corrected based on the detected pixel data.

On the other hand, in the image output apparatuses such as the ink jet printer, two sides of high-speed printing and high image quality printing are demanded, but it is actually remarkably difficult to establish both of these sides. Therefore, usually, a plurality of printing modes are presented, and a user can select the mode from user interfaces such as a printer driver in accordance with a purpose of that time.

Moreover, in these image output apparatuses, besides a so-called common sheet, a coated sheet, glossy sheet, glossy film, OHP sheet, and other recording media can be printed. In general with these apparatuses, the user also designates a kind of recording medium to be printed from the user interface, the printer driver or the like accordingly prepares printing data by an image processing, and an engine section of the image output apparatus performs printing based on the data. The image processing in accordance with the recording medium includes: correcting the color in accordance with a color reproduction range of each recording medium, or controlling an ink amount in accordance with an allowable ink amount per unit area of each recording medium for the ink jet printer.

In order to detect the watermark, there are methods of subjecting the image data to orthogonal conversion to detect the watermark in a frequency region, detecting a mark constituted of a plurality of concentric circles different in diameter in an actual space region, evaluating whether a pattern matches with a pre-registered pattern, and the like.

Among the various methods for detecting the watermark, since the method of detecting the watermark in the frequency region uses a heavy-load processing of the orthogonal conversion, many image memories and much processing time are necessary. Moreover, when the mark embedded in the actual space region is detected, the similar problem occurs. Because the pattern matching has to be performed in a broad area.

Particularly, it is assumed that the watermark is embedded in the paper money, stamp, securities, and the like, and such watermark is detected to detect the paper money, stamp, securities, and the like. In this case, no watermark is embedded in a large number of pieces of information to be subjected to a detection processing. However, in order to judge that no watermark is embedded, while detection conditions are changed, the detection processing is performed a plurality of times. This requires enormously much time.

Even in this situation, for expensive apparatuses such as a copying machine, the problem can be solved by disposing a huge memory or hardware for detection inside the apparatus. However, in the image output apparatuses used by the general user, such as the ink jet printer, in connection with cost, these processings have to be performed by the printer, or firmware or software in the printer. Therefore, the processing does not catch up with a printing processing speed of a printer engine, the printer stops, or another serious performance deterioration occurs.

SUMMARY OF THE INVENTION

An object of the present invention is to provide an image processing apparatus, an image processing method, and a storage medium which can solve at least one of the aforementioned problems.

Another object of the present invention is to realize judgment even for a mark drawn in response to a drawing command, or for an image output apparatus in which an original image is subjected to a correction processing without deteriorating judgment precision.

Still another object of the present invention is to minimize a decrease of processing speed for detection of the mark.

To achieve the aforementioned objects, according to the present invention, there is provided a preferred embodiment comprising: judgment means for judging, in a state in which a drawing command is rasterized, whether the rasterized image includes specific information; and control means for controlling printing of the rasterized image according to a result of the judgment.

Moreover, according to the present invention, there is provided a preferred embodiment comprising: histogram creation means for creating a histogram based on an original image; judgment means for using specific information to judge whether the original image is a specific image; and printing means for, when it is judged from the histogram that the original image is not the specific image, printing the original image without performing the judgment by the judgment means.

Furthermore, to achieve the objects, according to the present invention, there is provided a preferred embodiment comprising: judgment means for judging color information of an original image; judgment means for using specific information to judge whether the original image is a specific image; and printing means for, when it is judged from the judgment of the color information that the original image is not the specific image, printing the original image without performing the judgment by the judgment means.

Additionally, to achieve the objects, according to the present invention, there is provided a preferred embodiment comprising: indication means for indicating a mode from a first printing mode and a second printing mode higher in speed than the first printing mode; judgment means for judging whether or not specific information exists in an original; and printing means for, when the indication means indicates the second printing mode, printing an image in accordance with the original without performing the judgment by the judgment means.

Moreover, to achieve the objects, according to the present invention, there is provided a preferred embodiment comprising: indication means for indicating a mode from a first printing mode for performing printing with a high image quality and a second printing mode for performing monochromatic printing; judgment means for judging whether or not specific information exists in an original; and printing means for, when the indication means indicates the second printing mode, printing an image in accordance with the original without performing the judgment by the judgment means.

Furthermore, to achieve the objects, according to the present invention, there is provided a preferred embodiment comprising: indication means for indicating any recording medium from a plurality of recording media; judgment means for judging whether or not specific information exists in an original; and printing means for, when the indication means indicates a predetermined recording medium, printing an image in accordance with the original without performing the judgment by the judgment means.

BRIEF DESCRIPTION OF THE DRAWINGS

FIG. 7 is a block diagram showing the image processing apparatus, printer and periphery according to the fifth embodiment;

FIG. 8 is a processing block diagram of the sixth embodiment; and

FIG. 9 is a processing block diagram of the seventh embodiment.

DETAILED DESCRIPTION OF THE PREFERRED EMBODIMENTS (First Embodiment)

The first embodiment of the present invention will be described hereinafter with reference to the drawings.

Figure 1:
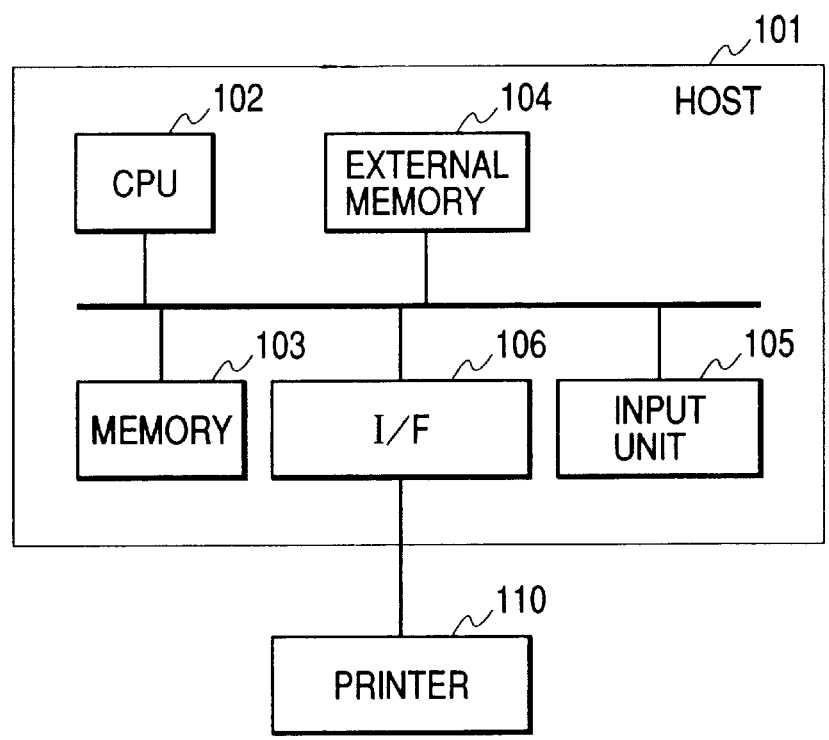
FIG. 1 is a block diagram of an image processing system which can be applied to the present invention.

FIG. 1 is an explanatory view showing one example of an image processing system to which the present invention can be applied.

In FIG. 1, a host 101 is provided with a CPU 102, memory 103, external memory 104, input unit 105, and interface 106 with a printer 110. The CPU 102 executes a program stored in the memory 103 to realize detection, judgment, color processing, quantization processing, and the like of a digital watermark or another mark for specifying a printing inhibition image. This program is stored in the external memory 104, or supplied from an external apparatus. The external memory pre-stores a pattern to be detected. The pattern may be an invisible digital watermark for embedding information in a specific frequency of an image, a visible digital watermark for embedding the information by a color invisible to human eyes (e.g., yellow dot), or any other digital watermark. Moreover, the pattern is not limited to the digital watermark, and any other pattern may be used. The host 101 is connected to the printer 110 via the interface 106, and quantized image data is transmitted to the printer 110 which is then allowed to perform printing/recording. The printer 110 is of an ink jet mode in which unit price is low, it is difficult to realize paper money judgment function with hardware, and the judgment function by software is preferably employed. A thermal transfer laser mode or another conventional known mode of printer can be used. Additionally, the color processing, quantization and other processings may be performed by a main body of the printer 110.

Figure 2:
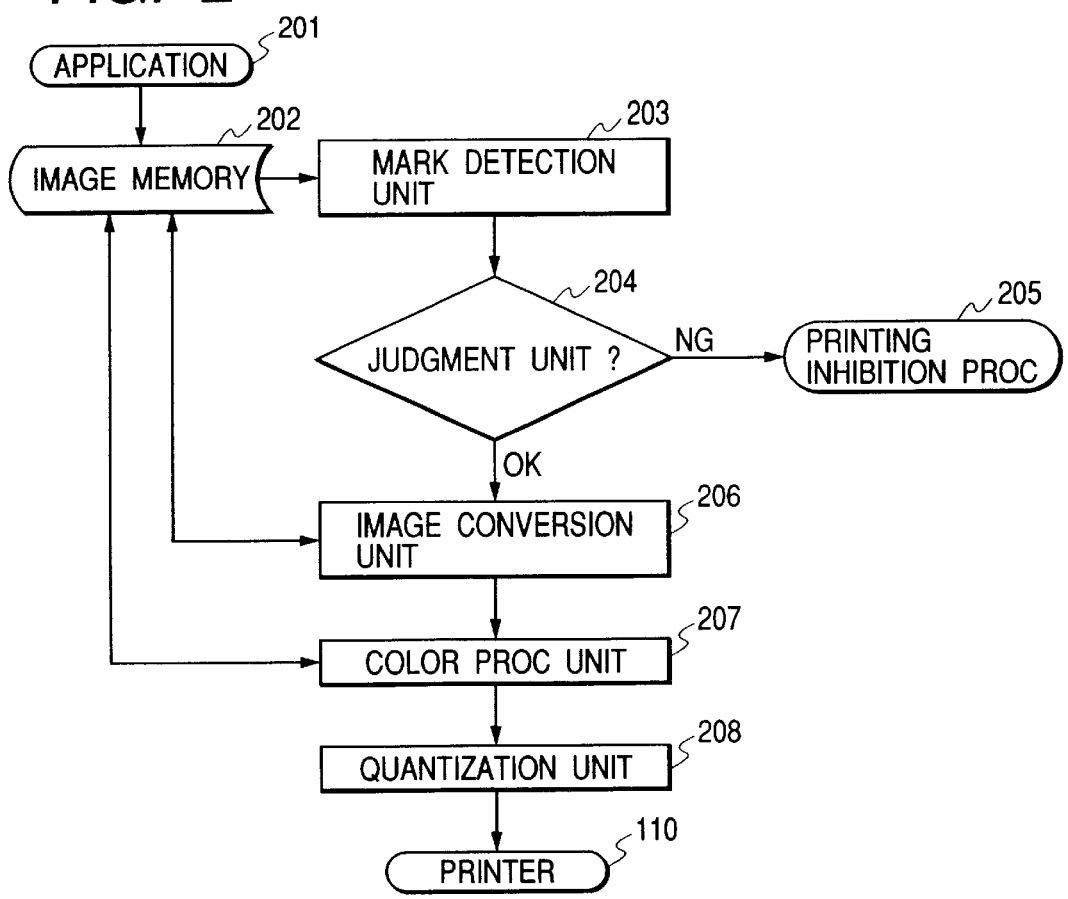
FIG. 2 is a block diagram showing an image processing apparatus, printer and periphery according to the first embodiment.

FIG. 2 is a block diagram showing an image processing by software executed by the program (printer driver) installed, for example, in the host computer, and outlines of periphery.

Based on a drawing command outputted from an application 201, image information, for example, of respective 8 bits of RGB, that is, 24 bits rasterized in the image to be printed is stored in an image memory 202 in the printer driver. The rasterizing may be performed in the application or the printer driver. For the rasterized RGB image stored in the image memory 202, a mark detection unit 203 detects whether or not there is a specific mark or an image pattern for specifying the pre-registered printing inhibition image, and a judgment unit 204 determines whether or not the image to be printed is inhibited from being printed. According to a result determined by the judgment unit 204, when it is judged that the image is inhibited from being printed (NG), the image is subjected to a printing inhibition processing 205, thereby ending this processing flow. The printing inhibition processing includes, for example, discontinuing the printing, issuing a warning, or intentionally coating the entire surface with a black ink as described above. When it is judged that the image is not inhibited from being printed (OK), the flow advances to a processing of an image conversion unit 206 for the image of the image memory 202. Image conversion executed by the image conversion unit 206 includes, for example, a processing of reducing a color noise, or an image scaling processing for spatially scaling the image data, and usually RGB data is converted to RGB data. Here, the original image data subjected to the conversion/correction is again secured in the image memory 202, and read to be processed in a color processing unit 207. In the next color processing unit 207, and a quantization unit 208 for the printer 110, a color processing and quantization of the image data are performed in a conventional known method, and the data is converted to data which can be printed by the printer 110.

When the drawing command is rasterized as described above, even the data represented by the drawing command received from a computer can be subjected to the judgment processing.

Moreover, since the judgment processing is performed after rasterizing and before various image conversions, judgment precision can be enhanced.

As described above, in a state in which the drawing command is rasterized to an output image, when it is judged whether or not the digital watermark or another mark indicative of the specific image exists in the image, even for the mark drawn in response to the drawing command from a personal computer, the existence of the mark can be judged without deteriorating the judgment precision.

Moreover, when it is judged whether or not the mark indicating the specific image exists in the image, the image processing for converting original image pixel data is performed, and the judgment is performed before the image processing, even for an image output apparatus in which the original image is subjected to the correction processing, the existence of the mark can be judged without deteriorating the judgment precision.

(Second Embodiment)

The second embodiment will be described hereinafter with reference to the drawings.

Figure 3:
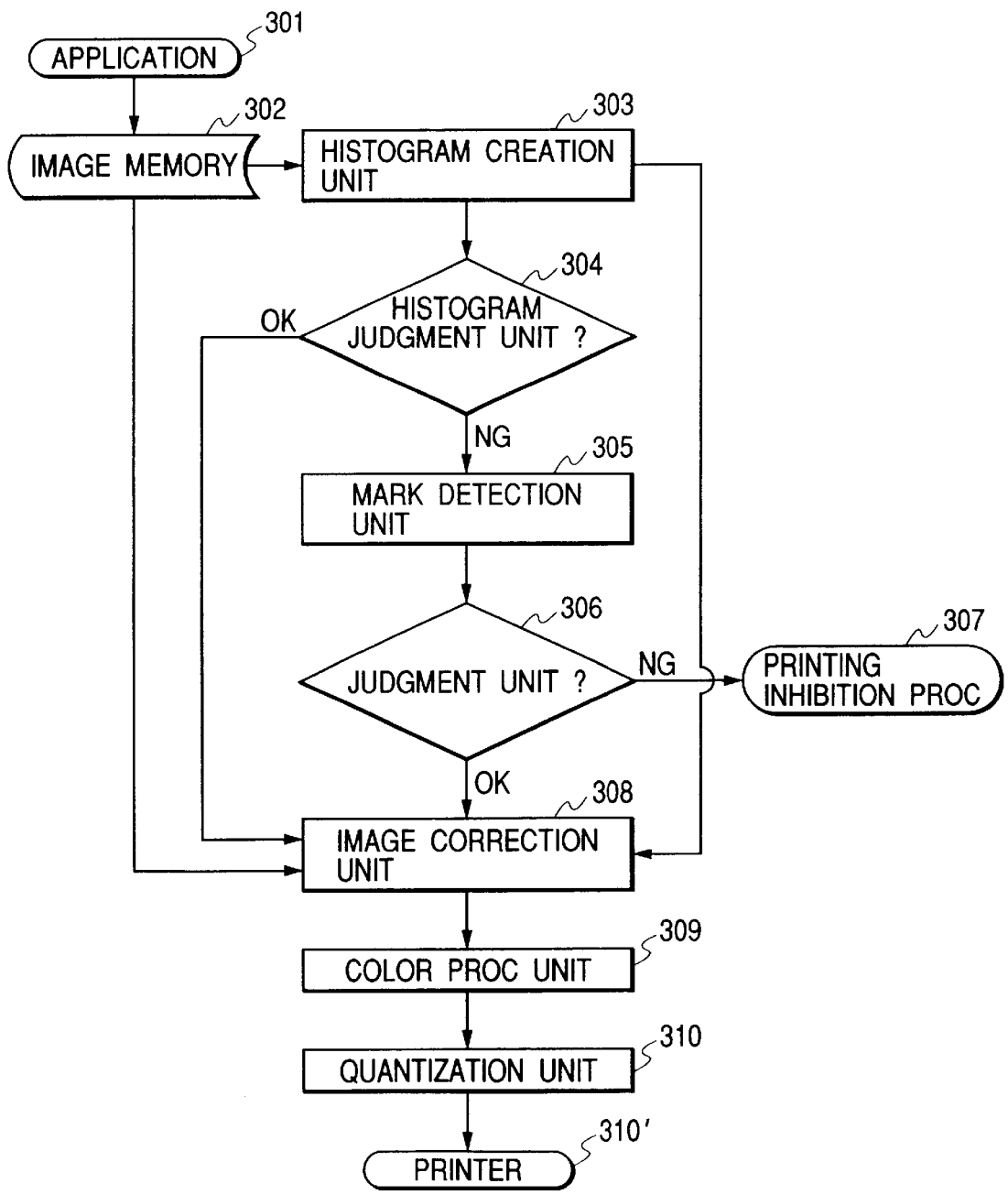
FIG. 3 is a block diagram showing the image processing apparatus, printer and periphery according to the second embodiment.

FIG. 3 is a block diagram showing the peripheral outline of the image processing by software executed by the program (printer driver) installed, for example, in the host computer.

Figure 4:
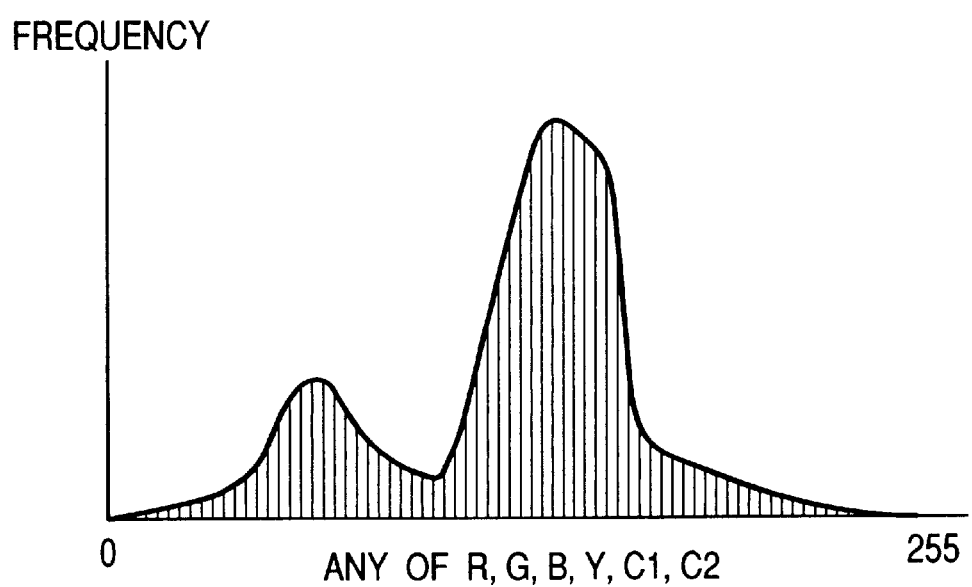
FIG. 4 shows an example of a histogram created in the second embodiment.

Based on the drawing command outputted from an application 301, the image information, for example, of respective 8 bits of RGB, that is, 24 bits rasterized in the image to be printed is stored in an image memory 302. The rasterizing may be performed in the application or the printer driver. For the RGB image stored in the image memory 302, a histogram creation unit 303 creates a histogram with respect to the respective channels of RGB as shown in FIG. 4. Here, as an element for creating the histogram, instead of RGB, the following calculation is performed, and the histogram may be created for the channel of YCC, or luminance Y out of the following.

Y (luminance)=0.30R+0.59G+0.11B

C1 (color difference)=R−Y

C2 (color difference)=B−Y

Selection of any one from these channels is associated with a judgment processing method described later. Additionally, when the channel is restricted, the histogram creation processing can be speeded up.

Based on the created histogram, a histogram judgment unit 304 judges whether the data is obviously the paper money, stamp, securities or the like.

A judgment method in the histogram judgment unit 304 will be described. As general characteristics of image data such as the paper money, stamp and securities to judge herein, any data relatively spreads in a gradation distributing manner, and there are no fact that specific luminance becomes dominant (e.g. its frequency exceeds 80%), or particularly that a dark color becomes dominant. The respective data will be described a little more concretely. •Paper money . . . . The paper money is usually printed in multiple colors, but the dark color rarely becomes dominant in a worldwide scale, and there is supposedly no fact that the dark color on at least front and back surfaces becomes dominant. •Stamp . . . . Many of stamps are printed in a single color, and in a relatively light color. No dark color becomes dominant. •Securities, and the like . . . . There are various types, but in any type there is supposedly no fact that the dark color becomes dominant.

Therefore, first the data with a distribution displaced toward the specific gradation in channels of R, G, B, Y may be excluded from a judgment object. Moreover, the data with a distribution displaced to the dark color in a gradation manner (a portion whose numeric value is small in the channels of R, G, B, Y) may be excluded from the judgment object.

Alternatively, as a consideration separate from the image density, since a high-chroma color is hardly used in the paper money, stamp, securities, and the like, high-chroma data (with a large numeric value in channels of C1, C2) may be excluded from the judgment object. In the histogram judgment unit 304, when the aforementioned respects are considered and it is obviously judged that the data is not the paper money, stamp, securities, or the like (OK), the flow advances to the processing of an image correction unit 308 described later. As a result, time-consuming software judgment can be skipped and a printing processing can be performed at high speed. When it cannot obviously be judged that the data is not the paper money, stamp, securities, and the like (NG), for the specific information such as a digital watermark, a mark detection unit 305 precisely detects by the aforementioned method whether or not there is a mark or an image pattern of pre-stored specific information such as the digital watermark, and a judgment unit 306 determines whether or not the image to be printed is inhibited from being printed. According to a result determined by the judgment unit 306, when it is judged that the image is inhibited from being printed (NG), the image is subjected to a printing inhibition processing 307, thereby ending this flow. The printing inhibition processing includes, for example, discontinuing the printing, issuing the warning, or intentionally coating the entire surface with the black ink as described above. When it is judged that the printing is not inhibited (OK), for the image of the image memory 302, the flow advances to an image correction unit 308. In image correction executed by the image correction unit 308, pixel data accumulated from a predetermined pixel value and corresponding to a predetermined frequency is detected in the histogram created by the histogram creation unit 303, and color balance, contrast and chroma are corrected based on the detected pixel data. Furthermore, next, a color processing unit 309 and quantization unit 310 perform color processing and quantization of the image data in the conventional known method, and the data is converted to data which can be printed by a printer 310'.

Additionally, since the histogram created beforehand is also utilized for correcting the image, a total processing time can be shortened.

Moreover, as a modification of the present embodiment, it can be assumed that the histogram judgment unit 304 is enhanced in precision and unified with the mark detection unit 305 and judgment unit 306.

The image which may not be subjected to the judgment of the paper money or the like by software can be distinguished as described above, and the image can be printed at a high speed except copy inhibition images such as a large number of paper moneys. Moreover, for the distinguishing, even when a new distinguishing processing is employed, an increase of processing time can be suppressed by using a part of the histogram processing heretofore used in the printer driver.

(Third Embodiment)

Figure 5:
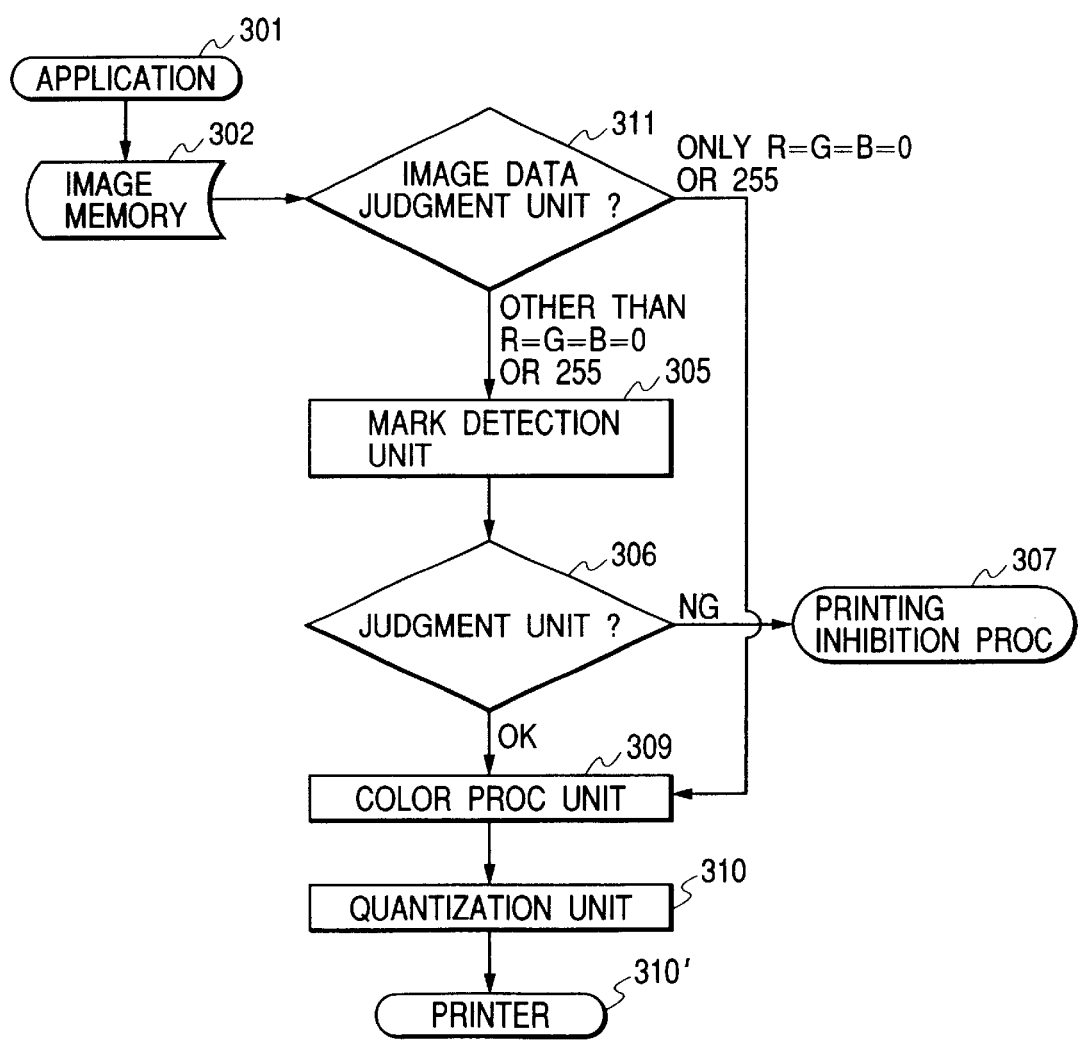
FIG. 5 is a block diagram showing the image processing apparatus, printer and periphery according to the third embodiment.

In the second embodiment, the histogram is created. However, for example, when the image data is particularly large, the creation of the histogram itself sometimes results in the increase of processing time. Therefore, the embodiment for judging that the data is not the paper money or the stamp with further simple means other than the histogram to further shorten the processing time will be described with reference to a block diagram of FIG. 5.

The image is rasterized to the image memory 302 from the application 301 in the same manner as described above, but an image data judgment unit 311 judges whether all the rasterized image data is only R=G=B=0 (black) or R=G=B=255 (white). If all the image data is R=G=B=0 or R=G=B=255, the data is only white and black, a document having the mark of the paper money, securities or the like cannot be considered, and the flow directly advances to the processing of a color processing unit 309. If one element of the image data is data other than R=G=B=0 or R=G=B=255, there is a possibility of a document having the mark of the paper money, securities or the like, the flow advances to the processings of and after the mark detection unit 305, and these processings are performed similarly as the first embodiment.

The data constituted only of white and black is distinguished in this manner, a most part of output image of the printer is then defined, and data such as monochromatic text, chart and line drawing required to be printed at a high speed may not be subjected to mark judgment. This method is very suitable particularly for the ink jet printer.

(Fourth Embodiment)

Figure 6:
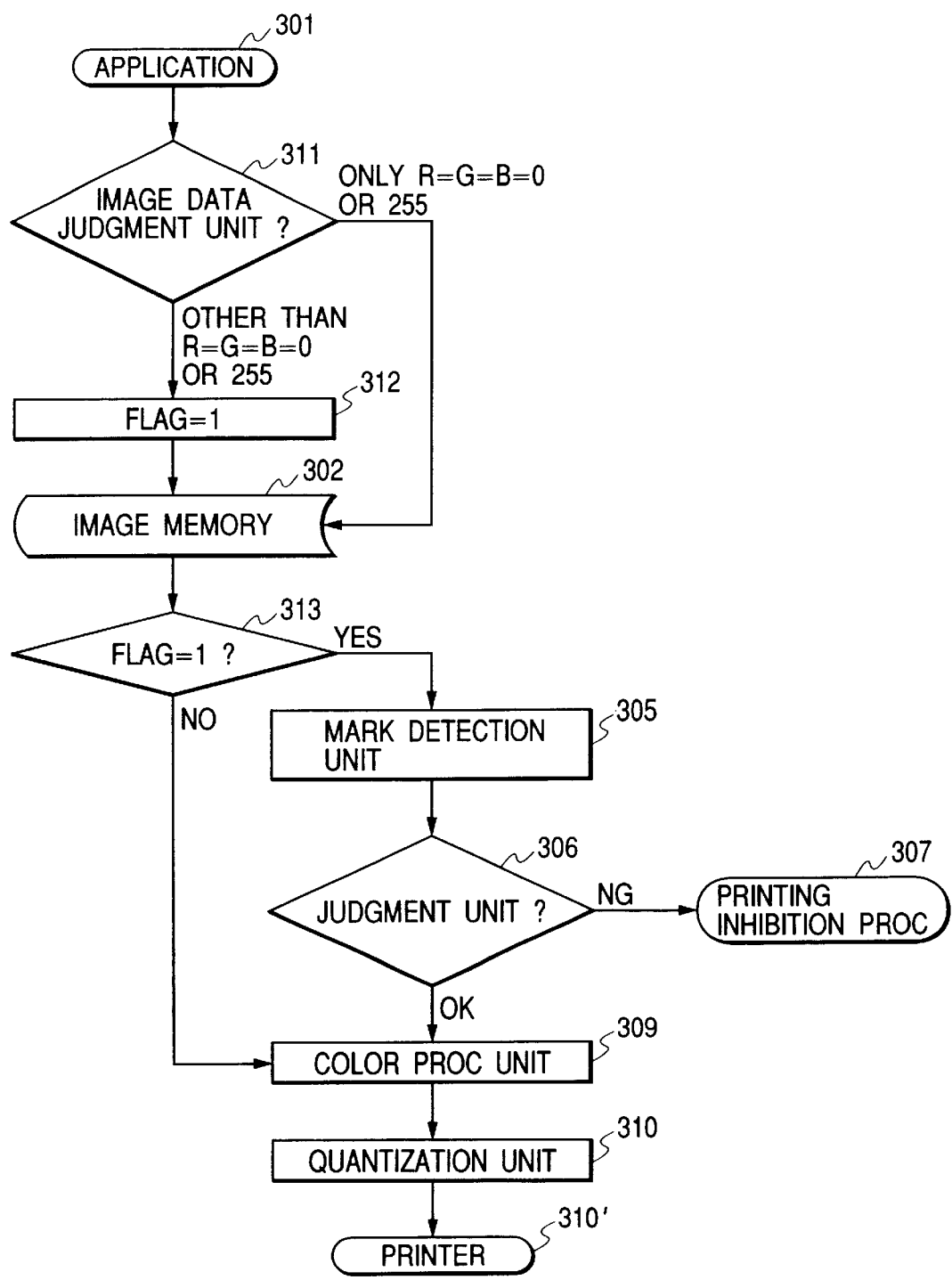
FIG. 6 is a block diagram showing the image processing apparatus, printer and periphery according to the fourth embodiment.

In the third embodiment, the rasterized image is subjected to the judgment of the image data. The embodiment for judging the image data before rasterizing to further shorten the processing time will be described with reference to a block diagram of FIG. 6.

The color information in the drawing command from the application 301 is judged by the image data judgment unit 311. Here, if there is color information other than the data of R=G=B=0 or R=G=B=255 even in one drawing command, 1 is substituted in flag data flag 312 of one bit stored in another place. An initial value of the flag is 0. If all the color information of the drawing command is R=G=B=0 or R=G=B=255, the flag remains to be 0. In this manner, all the drawing commands are rasterized into the image memory 302 via the image data judgment unit 311.

Subsequently, a unit 313 for judging a flag value judges whether the flag value is 0 or 1. When flag=0, the data is only white and black, the document having the mark of the paper money, securities, or the like cannot be considered, and the flow directly advances to the processing of the color processing unit 309. When flag=1, there is a possibility of the document having the mark of the paper money, securities, or the like, the flow advances to the processings of and after the mark detection unit 305, and the processings are performed similarly as the second and third embodiments.

When the image data is judged and then rasterized, as compared with when the rasterizing precedes the judgment, the judgment processing and the rasterizing can be performed in one processing. Even the rasterized data covering a plurality of pixels can sometimes be described in one drawing command, the number of judgment processings can be reduced, and processing speed can therefore be raised.

As described above, according to the present invention, there are provided histogram creation means for creating the histogram based on the original image, judgment means for using the specific information to judge whether the original image is the specific image, and printing means for, when it is judged from the histogram that the original image is not the specific image, printing the original image without performing the judgment by the judgment means. Therefore, it is possible to print the original image, for example, from the histogram used in the image correction processing without performing the judgment of the specific image, and the high-speed printing can be realized.

Moreover, since there are provided judgment means for judging the color information of the original image, judgment means for using the specific information to judge whether the original image is the specific image, and printing means for, when it is judged from the judgment of the color information that the original image is not the specific image, printing the original image without performing the judgment by the judgment means, the high-speed printing becomes possible depending upon the color information of the original image without performing the time-consuming judgment of the specific image.

(Fifth Embodiment)

One embodiment in the present invention will be described hereinafter with reference to the drawing.

FIG. 7 is a block diagram showing the outline of the periphery of the image processing by the software executed by the program (printer driver) installed, for example, in the host computer.

Here, a printer 710 is an ink jet printer in which the unit price is low, it is difficult to realize the paper money judgment function with hardware, and the judgment function by software is preferably employed. Additionally, a laser printer and other printers may obviously be used. The printer 710 has at least two high-speed and high image quality printing modes. In the high-speed mode, for a purpose of printing characters, line drawings and other data in a legible range at a high speed, speeding-up is realized by printing the data with one scanning of a printing head, performing a thinning printing, or printing the data only in large dots even when the printing head can be modulated in large/small dots. On the other hand, image quality is not very satisfactory in that there is banding unevenness, printing density is low, and granular feeling is coarse.

Moreover, the printer 710 has a function of changing over head control or sheet feed amount in the printing method in accordance with the recording media such as a common sheet, coated sheet, glossy sheet, glossy film and OHP sheet. The printer driver performs color correction in accordance with the respective recording media or the color reproduction range of the printing mode, or controls an ink amount in accordance with an ink allowable amount per unit area of each recording medium for the ink jet printer. Also in an electrophotographic image output apparatus, a toner amount is similarly controlled.

A user designates the printing mode and sets the recording medium from an input unit 705 via a user interface.

Based on the drawing command outputted from an application 701, the image information, for example, of respective 8 bits of RGB, that is, 24 bits rasterized in the image to be printed is stored in an image memory 702 in the printer driver. The rasterizing may be performed in the application or the printer driver.

On the other hand, the high-speed or high image quality printing mode is inputted as an input of the user interface from the input unit 705. Moreover, when it is judged in an input data judgment unit 703 that the printing mode is a high-speed mode, the image quality is inferior as described above, even counterfeit of the paper money, stamp, securities, and the like can visibly be distinguished soon, and it is therefore unnecessary to detect the specific information such as the digital watermark. Therefore, the data of the image memory 702 skips the next detection of the specific information mark such as the digital watermark, and judgment means to advance directly to the processing of a color processing unit 707. As a result, the time-consuming judgment by the software processing can be skipped and high-speed printing can be performed.

When the input data judgment unit 703 judges that the printing mode is not the high-speed mode, this processing flow advances to the processing of a specific information mark detection unit 704. It is precisely detected by the aforementioned method whether or not there is a pre-stored specific information mark or image pattern, and a judgment unit 705' determines whether or not the image to be printed is inhibited from being printed. According to a result determined by the judgment unit 705', if it is judged that the printing is inhibited (NG), the image is subjected to a printing inhibition processing 706, thereby ending the flow. The printing inhibition processing includes, for example, discontinuing the printing, issuing the warning, or intentionally coating the entire surface with the black ink. When it is judged that the printing is not inhibited (OK), the flow advances to the processing of the color processing unit 707.

After the color processing unit 707, a quantization unit 708 quantizes the image data in the conventional known method, and converts the data to data which can be printed by the printer 710.

In the present embodiment, when the printing mode is the high-speed mode, the mark detection/judgment is skipped. However, in some case, the image output apparatus has a "gray scale mode" in which even the color image is constantly converted to a monochromatic image to be outputted. Even in this mode, since there is usually no monochromatic image of paper money or securities, the mark detection/judgment may be skipped in the same manner. In the aforementioned high-speed printing mode or the gray scale mode in which it is evidently impossible to use a printed material as a counterfeit (a malicious operator who creates the counterfeit does not use this mode during counterfeiting), a counterfeit judgment processing requiring a large amount of processing time is skipped. Therefore, the counterfeit judgment during the mode inappropriate for the counterfeit can be prevented and high-speed printing can be realized. On the other hand, during the high image quality mode in which there is a possibility that the printed material is used as the counterfeit (there is a high possibility that the operator who creates the counterfeit uses this mode during counterfeiting), the counterfeit judgment can be performed to securely prevent the counterfeit.

(Sixth Embodiment)

In general, since the paper money, stamp, securities, and the like are formed of common sheets, in a case in which the recording medium is other than the common sheet, the aforementioned mark detection is unnecessary. Therefore, instead of the judgment by the printing mode as in the aforementioned first embodiment, the judgment by the recording medium kind is performed and the mark detection/judgment is skipped. This example is shown in FIG. 8. This is different from FIG. 7 in that the kind of the recording medium is inputted from the input unit 705. The judgment unit 703 judges whether the inputted recording medium is the common sheet. When the medium is the common sheet, the processing flow advances to the processings of and after mark detection unit 704. When the medium is other than the common sheet, the processings of and after the mark detection unit 704 are skipped, and the flow advances to the processing of the color processing unit 707. The subsequent processings are similar to those of the fifth embodiment of FIG. 7.

Here, when the common sheet is actually printed, and the input other than the common sheet is set from the user interface, a problem occurs that the printing is enabled without performing the mark detection. However, in the ink jet printer, generally with the coated sheet, glossy sheet and glossy film, other than the common sheet, the ink allowable amount per unit area of the recording medium is larger than that of the common sheet. Therefore, the image processing in which an actual ink ejection amount increases is performed by the printer driver. Therefore, when the common sheet is printed in the setting other than the common sheet, the ink ejection amount is excessively large, problems therefore occur such as blur and wavy sheet, and the counterfeit becomes difficult.

(Seventh Embodiment)

FIG. 9 shows an example for solving the problems of the sixth embodiment in which the common sheet is intentionally printed in the setting other than the common sheet. Here, instead of inputting the kind of the recording medium from the input unit 705, a recording medium discrimination sensor 709 is disposed to automatically distinguish the kind of the recording medium to be printed by the printer 710. As an example of the recording medium discrimination sensor, paper reflects much light, OHP transmits light, and such properties of reflective light are used. After a discrimination result in the recording medium discrimination sensor 709 is judged by the judgment unit 703, the same processings as those of the sixth embodiment are performed.

As described above, there are provided the indication means for indicating the mode from the first printing mode and the second printing mode higher in speed than the first printing mode, judgment means for judging whether or not the specific information exists in the original, and printing means for, when the indication means indicates the second printing mode, printing the image in accordance with the original without performing the judgment by the judgment means. Since the judgment of the specific information is not performed during the second printing mode, the printing processing can be performed at a high speed.

Moreover, there are provided the indication means for indicating the mode from the first printing mode for performing the high image quality printing and the second printing mode for performing the monochromatic printing, judgment means for judging whether or not the specific information exists in the original, and printing means for, when the indication means indicates the second printing mode, printing the image in accordance with the original without performing the judgment by the judgment means.

Therefore, during the mode in which it is unnecessary to judge the specific information and the monochromatic printing is performed, the printing speed can be enhanced.

Furthermore, there are provided indication means for indicating any recording medium from a plurality of recording media, judgment means for judging whether or not the specific information exists in the original, and printing means for, when the indication means indicates the predetermined recording medium, printing the image in accordance with the original without performing the judgment by the judgment means. Therefore, the printing of the recording medium for which it is unnecessary to judge the specific information can be performed at a high speed.

(Other Embodiments)

A method of storing a program for operating the aforementioned embodiment constitution to realize the aforementioned embodiment function into a storage medium, reading the program stored in the storage medium as a code, and executing the present embodiment in a client computer and a server computer is included in categories of the aforementioned embodiments, and the storage medium in which the aforementioned program is stored is also included in the aforementioned embodiments. As the storage medium, for example, a floppy disk, hard disk, optical disk, optomagnetic disk, CD-ROM, magnetic tape, nonvolatile memory card, and ROM can be used. Moreover, the present invention is not limited to a constitution in which the program stored in the storage medium singly executes the processing. Furthermore, a constitution for cooperating with another software, and expansion board function, and operating on OS to execute the aforementioned embodiment operation is also included in the categories of the aforementioned embodiments.

What is claimed is:

1. An image processing apparatus comprising:

indication means for indicating a mode from a first printing mode and a second printing mode higher in speed than the first printing mode;

judgment means for judging whether or not specific information exists in an original; and printing means for, when said indication means indicates the second printing mode, printing an image in accordance with the original without performing the judgment by said judgment means, wherein, when the first printing mode is indicated as a judgment result by said judgment means, said printing means normally prints the image in accordance with the original in a case in which the specific information does not exist, and performs at least one of abnormally printing the image in accordance with the original, generating a warning in a monitor, and performing no printing in a case in which the specific information exists.

2. An apparatus according to claim 1, wherein the first printing mode is a high image quality printing mode, and the second printing mode is a high speed printing mode.

3. An apparatus according to claim 1, wherein the specific information is a digital watermark.

4. An apparatus according to claim 1, wherein the judgment processing is performed by a software processing in which a program is used.

5. An apparatus according to claim 4, wherein the program is included in a printer driver.

6. An apparatus according to claim 3, wherein the digital watermark includes an invisible digital watermark or a visible digital watermark.

7. An apparatus according to claim 1, wherein the printing is performed in an ink jet mode.

8. An apparatus according to claim 1, wherein the indication is determined by manual indication by an operator.

9. An apparatus according to claim 1, wherein the first printing mode is higher in image quality, but slower in processing speed that the second printing mode.

10. An image processing method comprising steps of:

indicating a mode from a first printing mode and a second printing mode higher in speed than the first printing mode; and when the second printing mode is indicated, printing an image in accordance with an original without judging whether or not specific information exists in the original, wherein, when the first printing mode is indicated as a judgment result, said printing step includes normally printing the image in accordance with the original in a case in which the specific information does not exist, and performs at least one of abnormally printing the image in accordance with the original, generating a warning in a monitor, and performing no printing in a case in which the specific information exists.

11. A storage medium which stores a program for executing steps of:

indicating a mode from a first printing mode and a second printing mode higher in speed than the first printing mode;

judging whether or not specific information exists in an original; and when said indication step indicates the second printing mode, printing an image in accordance with the original without judging whether or not the specific information exists in the original, wherein, when the first printing mode is indicated as a judgment result, said printing step includes normally printing the image in accordance with the original in a case in which the specific information does not exist, and performs at least one of abnormally printing the image in accordance with the original, generating a warning in a monitor, and performing no printing in a case in which the specific information exists.

* * * * *

UNITED STATES PATENT AND TRADEMARK OFFICE
CERTIFICATE OF CORRECTION

PATENT NO. : 6,876,460 B2
APPLICATION NO. : 09/770314
DATED : April 5, 2005
INVENTOR(S) : Torigoe It is certified that error appears in the above-identified patent and that said Letters Patent is hereby corrected as shown below:

COLUMN 2:
Line 62, "occurs.  Because" should read -- occurs, because --.

COLUMN 6:
Line 26, "are" should read -- is --.

COLUMN 12:
Line 17, "that" should read -- than --.

Signed and Sealed this

Twenty-first Day of November, 2006

JON W. DUDAS
*Director of the United States Patent and Trademark Office*